United States Patent
Steiger et al.

(10) Patent No.: US 8,568,204 B2
(45) Date of Patent: Oct. 29, 2013

(54) MATERIAL REMOVING TOOL

(75) Inventors: Marco Steiger, Uesslingen (CH); David Suter, Turbenthal (CH)

(73) Assignees: maRoc GmbH (CH); C. & E. Fein GmbH (DE)

( * ) Notice: Subject to any disclaimer, the term of this patent is extended or adjusted under 35 U.S.C. 154(b) by 0 days.

(21) Appl. No.: 13/165,598

(22) Filed: Jun. 21, 2011

(65) Prior Publication Data

US 2011/0256814 A1 Oct. 20, 2011

Related U.S. Application Data

(63) Continuation of application No. 09/917,998, filed on Jul. 30, 2001, now abandoned, which is a continuation-in-part of application No. 09/123,759, filed on Jul. 27, 1998, now abandoned.

(30) Foreign Application Priority Data

May 28, 1997 (CH) .................................. 1254/97
Aug. 21, 1997 (CH) .................................. 1952/97
Oct. 29, 1997 (CH) .................................. 2502/97

(51) Int. Cl.
*B23F 21/03* (2006.01)

(52) U.S. Cl.
USPC ........... 451/540; 451/344; 451/356; 606/167; 606/176; 30/166.3; 30/346; 30/351; 30/353; 30/355

(58) Field of Classification Search
USPC ............... 451/344, 356, 540; 606/8.279, 167, 606/176; 30/166.3, 346, 351, 353, 355, 357
See application file for complete search history.

(56) References Cited

U.S. PATENT DOCUMENTS

| | | | |
|---|---|---|---|
| 2,332,613 A | 10/1943 | Swank | |
| 3,033,251 A | 5/1962 | Atkinson et al. | |
| 3,530,577 A | 9/1970 | Franklin et al. | |
| 3,601,114 A | 8/1971 | Cook | |
| 3,905,105 A | 9/1975 | Tuke | |
| 3,905,374 A | 9/1975 | Winter | |
| 4,008,720 A | 2/1977 | Brinckmann et al. | |
| 4,252,121 A | 2/1981 | Arnegger | |
| 4,513,742 A | 4/1985 | Arnegger | |
| 4,768,504 A | 9/1988 | Ender | |
| 5,016,356 A | 5/1991 | Trench | |
| 5,038,478 A * | 8/1991 | Mezger et al. ............... 30/272.1 |
| 5,178,626 A | 1/1993 | Pappas | |
| 5,231,910 A * | 8/1993 | Harsch et al. ................... 83/875 |
| 5,265,340 A | 11/1993 | Nitz et al. | |
| 5,280,676 A | 1/1994 | Fieni | |
| 5,306,285 A * | 4/1994 | Miller et al. .................. 606/177 |
| 5,382,249 A | 1/1995 | Fletcher | |
| 5,427,188 A | 6/1995 | Fisher | |
| 5,507,763 A | 4/1996 | Petersen et al. | |
| 5,697,835 A | 12/1997 | Nitz et al. | |
| 6,022,353 A * | 2/2000 | Fletcher et al. .................. 606/79 |
| 6,058,923 A * | 5/2000 | Arntz et al. ..................... 125/15 |
| 6,267,594 B1 | 7/2001 | Hugo | |

* cited by examiner

*Primary Examiner* — Lee D Wilson
*Assistant Examiner* — Shantese McDonald
(74) *Attorney, Agent, or Firm* — St. Onge Steward Johnston & Reens LLC

(57) ABSTRACT

A material removing tool, such as a cutting or grinding tool, adapted to be oscillated by the output shaft of a manually operable motor-driven apparatus, is provided with at least one elongated cutting edge defined by teeth or analogous cutting elements arranged in at least one at least substantially straight linear array.

16 Claims, 4 Drawing Sheets

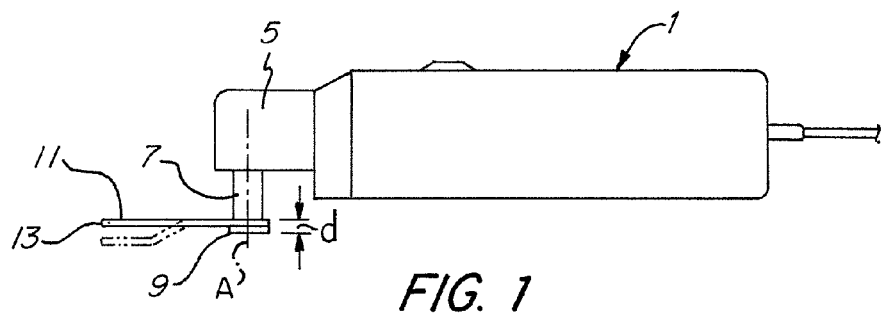
FIG. 1
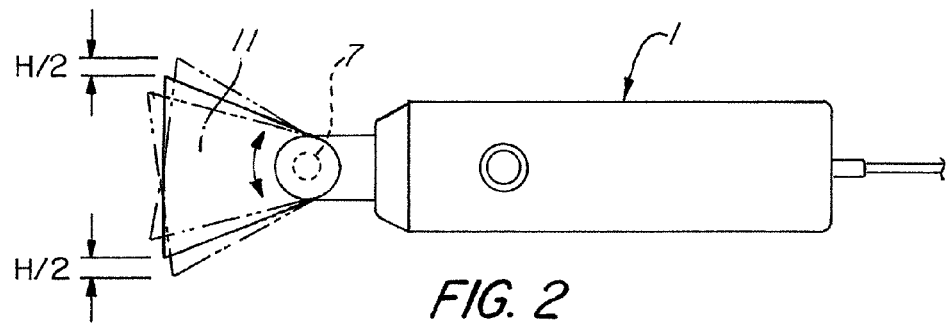
FIG. 2
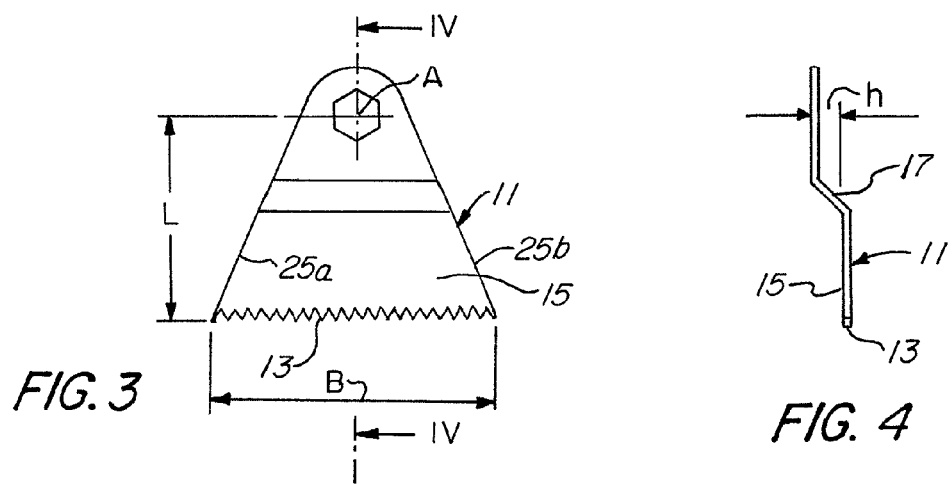
FIG. 3
FIG. 4

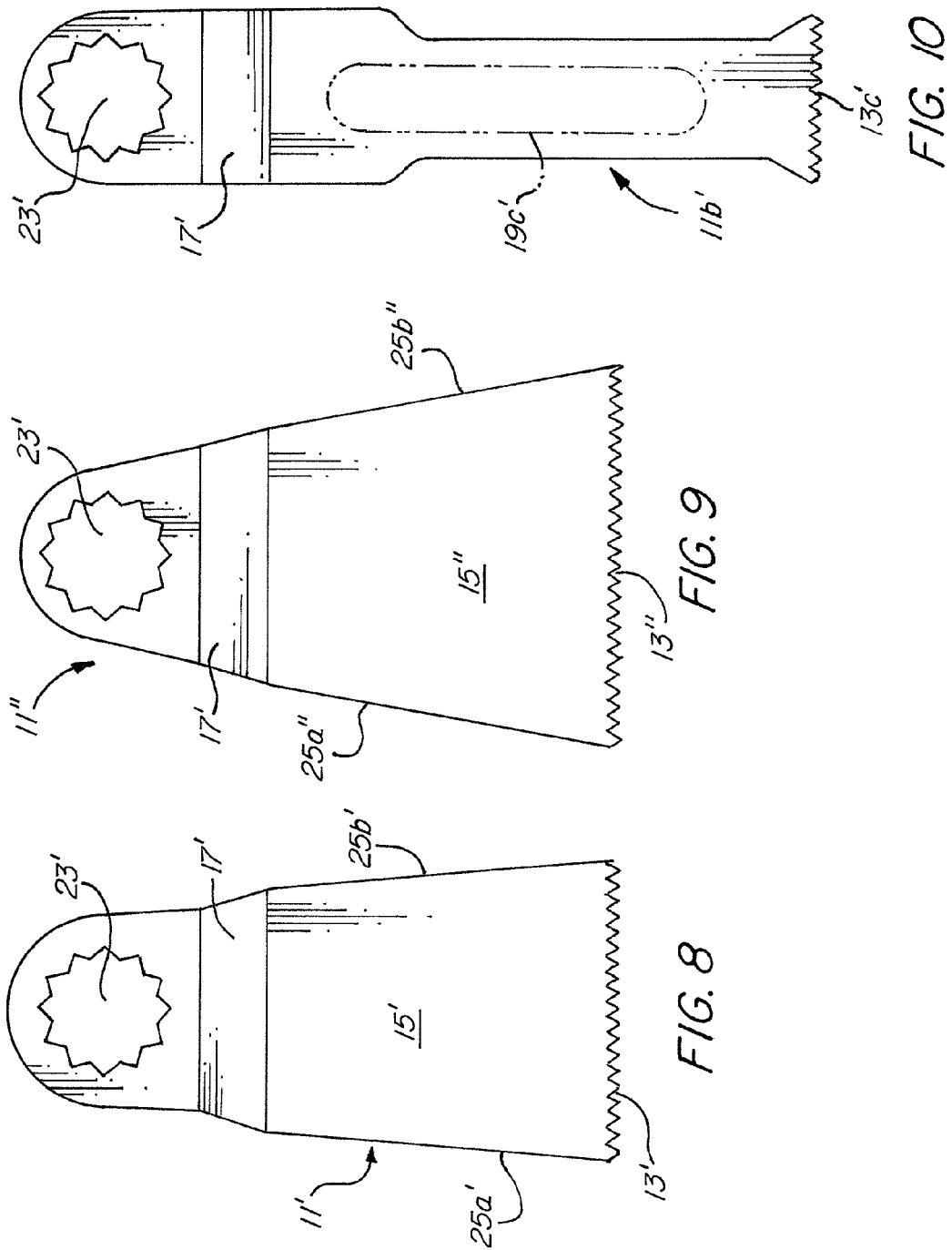

MATERIAL REMOVING TOOL

CROSS-REFERENCE TO RELATED APPLICATIONS

This application is a continuation of U.S. patent application Ser. No. 09/917,998 filed Jul. 30, 2001 now abandoned, which is a continuation-in-part of abandoned U.S. patent application Ser. No. 09/123,759 filed on Jul. 27, 1998, which claims priority from Swiss Patent Application No. 02502/97 filed Oct. 29, 1997, Swiss Patent Application No. 01952/97 filed Aug. 21, 1997 and Swiss Patent Application No. 01254/97 filed May 28, 1997. The content of all prior applications is incorporated herein by reference.

FIELD OF THE INVENTION

The present invention relates to improvements in apparatus of the kind in which a material removing tool is arranged to move relative to a workpiece, and more particularly to improvements in apparatus in which a material removing tool (such as a cutting or grinding tool) is arranged to be mounted on a motor-driven output shaft and carry out oscillatory movements when in actual use.

BACKGROUND OF THE INVENTION

Prior art is replete with disclosures of apparatus or implements which are provided with material removing tools arranged to be mounted on the output shafts of the apparatus and being adapted to execute oscillatory movements. In many instances, the oscillatory movement involves a back-and-forth movement through about two angular degrees at a frequency of about 20,000 oscillations per minute. Such conventional apparatus may be designed for numerous applications, or they are constructed for specific applications. Many conventional apparatus are used to remove, without causing damage, bonded windshields from automobile bodies, to saw, cut or grind across or through parts of automobile bodies, to cut gaps into tiles, and so forth.

The material removing parts (such as blades) of conventional tools resemble spoons or sickles; but the cutting portions engaging a workpiece are always curved, the curvature of the cutting portion either corresponding to that of the path of movement executed by the tool or being inclined relative thereto. While the just described tools can be put to many uses, they are not suited for the making of accurate laterally limited and definable recesses or grooves in a workpiece.

An apparatus or implement for use with a grinding tool is disclosed in published German patent application Serial No. A 44 15 848. The underside of such apparatus can be adjacent an angular saw blade which is arranged to perform cuts for removing the lower ends of door frames when laying hardwood floors. Since oscillating grinders execute rotary movements, they cannot be used to form precisely defined recesses or grooves.

It is an object of the present invention to provide an apparatus or implement which can employ a material removing (such as a cutting and/or grinding) tool that is more versatile than heretofore known apparatus of such character.

A more specific object of the invention is to provide a novel and improved cutting and/or grinding tool which can make in a workpiece cuts with clean (such as accurately defined) lateral edges.

Another object of the invention is to provide a material removing (such as cutting or grinding) tool for forming in any of a variety of different workpieces grooves bounded by accurately defined walls.

Still another object of the invention is to provide a material removing (such as a cutting or a grinding) tool which is capable of forming recesses bounded by plane surfaces and extending at right angles to a selected surface of a workpiece.

A further object of the invention is to provide a tool kit with two or more different tools which can be utilized selectively in a single apparatus to carry out any one of a plurality of different cutting, grinding and analogous material removing operations.

Another object of the invention is to provide a tool of the above outlined character with novel and improved means for facilitating and/or inducing controlled and predictable evacuation of chips, shavings, granules and/or other fragments of material from the locale of contact between the tool and a workpiece.

An additional object of the invention is to provide a simple, compact and inexpensive tool which can be put to use for controlled removal of material from hard-to-reach parts of wooden, metallic, plastic and/or other types of workpieces.

SUMMARY OF THE INVENTION

In accordance with one presently preferred embodiment of the invention, there is provided a material removing tool in which at least one material removing (such as cutting or grinding) edge is remote from the axis about which the tool oscillates and is provided with at least one linear array of saw teeth or analogous material removing parts disposed along at least one at least substantially straight line.

By means of the straight-line arrangement of the material removing parts at the material removing (such as cutting) edge or edges, and by a tangential disposition of the cutting edge or edges with respect to the fulcrum for the tool, it is now possible to perform a cutting action in a plane which is parallel to a surface of a workpiece and thus to form rectangular recesses and cuts even in the corners of workpieces. Depending upon the structure of its material removing parts, the tool can be utilized for controlled removal of material from wood, gypsum or plaster of paris, composite materials, stones and metallic parts.

In accordance with another presently preferred embodiment of the invention, the saw teeth or other suitable material removing parts are disposed along two or more straight lines at an angle relative to each other. This renders it possible to form a bottom surface extending at least substantially at right angles relative to a recess or cutting surface and being parallel to the surface bounding a groove or a recess.

Lateral tapering of the tool and/or the provision of at least one (e.g., a central longitudinal) cut within the cutting tool permit for an otimum chip removal and prevent jamming of the tool between the surfaces formed by the tool.

The tool is or can be provided with a taper at both sides and preferably directly adjacent the material removing parts.

Alternatively, a longitudinal cut can be provided in the center portion of the tool to receive the removed material and to enable such material to move rearwardly.

Forward movement of the tool requires the exertion of a relatively small force because the tool can automatically advance into the workpiece.

For example, one can form cuts which are parallel to a given surface from a surface extending at a desired angle to the given surface.

A feature common to all or practically all presently preferred embodiments of our invention is that the improved tool can be put to use with a manually operable material removing apparatus having a power driven output shaft (e.g., a shaft driven by an electric or fluid-operated motor) arranged to oscillate about a predetermined axis. The tool comprises an elongated member having a first section arranged to be mounted on the output shaft so that the member extends in a direction at least substantially normal to the predetermined axis, and a second section which is remote from the first section and includes at least one at least substantially straight cutting edge which is at least substantially normal to the aforementioned direction.

The cutting edge is or can be provided with material removing elements (such as teeth or industrial diamonds) which can constitute cutting and/or grinding elements. It is also possible to employ material removing elements which comprise corundum.

At least a major part of the aforementioned elongated member is or can be flat, and the first section of such member is or can be provided with an aperture (e.g., an aperture bounded by a polygonal surface) for the shaft. Such elongated member can have an at least substantially constant width, at least between its first and second sections; it can have a substantially trapeziform outline; or it can comprise a third section which is disposed between the first and second sections and has a width different from (e.g., less than) that of the first and/or second section.

A further feature of the present invention resides in the provision of a tool kit which can be utilized with a manually operable material removing apparatus having a power-driven output shaft arranged to oscillate about a predetermined axis. The improved tool kit comprises a plurality of discrete tools each including an elongated member having a first section arranged to be non-rotatably but separably mounted on the output shaft in a position in which the elongated member extends in a direction at least substantially at right angles to the predetermined axis, and a second section comprising at least one at least substantially straight cutting (material removing) edge which is at least substantially normal to the aforementioned direction upon mounting of the respective first section on the output shaft.

The tools of the kit have (or can have) different parameters such as their widths, the distances between the first sections and the respective cutting edges, and the lengths of their cutting edges.

At least one of the tools constituting the kit can be provided with the aforediscussed and/or other suitable means for facilitating the evacuation of material being removed by the cutting edge or edges of the at least one tool in actual use of the at least one tool.

The novel features which are considered as characteristic of the invention are set forth in particular in the appended claims. The improved tools themselves, however, both as to their construction and the modes of installing and utilizing the same, together with numerous additional important and advantageous features and attributes thereof, will be best understood upon perusal of the following detailed description of certain presently preferred specific embodiments with reference to the accompanying drawings.

BRIEF DESCRIPTION OF THE DRAWINGS

FIG. 1 is a side elevational view of an apparatus embodying one form of the invention and having an oscillatable output shaft mounting a material removing tool of the type shown in FIGS. 2 to 4;

FIG. 2 is a plan view of the apparatus which is shown in FIG. 1;

FIG. 3 is an enlarged plan view of the tool;

FIG. 4 is a longitudinal sectional view as seen in the direction of arrows from the line IV-IV in FIG. 3;

FIG. 8 is a plan view of a tool which is similar to the tool shown in FIG. 3;

FIG. 9 is a plan view of a tool constituting a modification of the tools shown in FIGS. 3 to 8;

FIG. 10 is a plan view of a tool constituting a modification of the tool which is illustrated in FIG. 7;

DETAILED DESCRIPTION OF THE INVENTION

Figure 5:
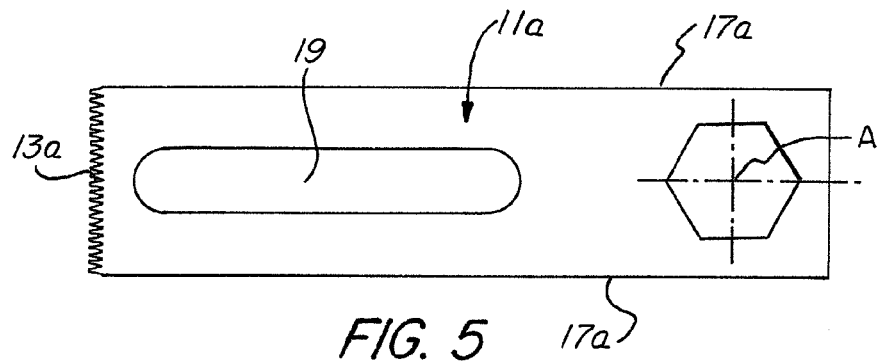
FIG. 5 is a plan view of a modified tool.

The motor-driven and manually operable implement or apparatus 1 depicted in FIG. 1 is provided with a housing including a handle 3 confining a prime mover (not shown) and a section 5 for a transmission (also not shown). The transmission is provided with an output shaft 7 extending outwardly from the housing section 5. At the free end of the shaft 7, there is provided a suitable tool fastening means, such as a chuck or a bolt 9, for rigidly attaching to the shaft a material removing tool 11. For example, the prime mover may constitute an electric or a fluid-operated (such as pneumatic) motor. The output shaft 7 is assumed to be adapted to execute oscillatory movements abut an axis A within a range of about two angular degrees and at a frequency which can be infinitely adjustable between zero and 20,000 cycles per minute.

One end section of the tool 11 is provided with a cutting edge 13 defined by numerous teeth. As used herein, the term "cutting edge" is intended to embrace one or more rows of teeth as well as one or more rows of cutting edges or surfaces. Depending upon its intended use, the cutting edge 13 may be defined by cutting teeth, preferably cross ground teeth or sawteeth, by industrial diamonds or, for work with metal, by corundum or other abrasive substances. In the embodiment which is illustrated in FIGS. 1 to 4, the cutting tool 11 includes a substantially trapezoidal flat elongated member 15 at the base of which the cutting edge 13 is formed. Preferably, the flat member 15 is provided with a step 17 the height h of which at least matches the thickness d of the fastener 9. The length L of the cutting tool 11, as measured between the section traversed by the axis A and the section including the cutting edge 13, may vary, depending upon the intended application of the tool. Of course, for the making of deep cuts the length L has to be greater than for the formation of shallow grooves. However, at a constant rotary angle of the apparatus 1 a greater length L will result in a greater stroke H/2. An optimum length is presently considered to be at last close to 80 mm. The maximum width B of the tool 11 (i.e., the length of the cutting edge 13 of the tool 11 shown in FIGS. 1 to 4) may be 60 mm; however, it may be much less for very small cuts and it will depend upon the length L.

In the embodiment of FIG. 5, the elongated tool 11a of constant width has a straight cutting edge 13a and is provided with parallel lateral edges 17a. An elongated slot 19 is provided at the center (i.e., in the constant-width intermediate section between the two end sections of the elongated member 15a) of the cutting tool 11a for the removal of shavings, chips, dust and other fragments of the material being cut.

Figure 6:
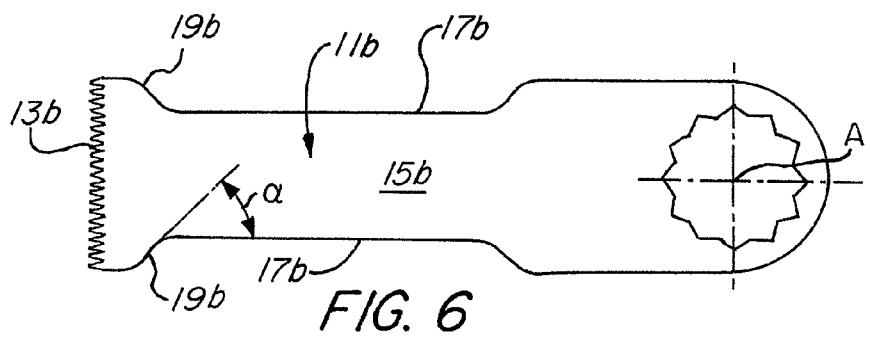
FIG. 6 is a plan view of a third tool.

In the tool 11b of FIG. 6, the lateral edges 17b of the elongated member 15b are also parallel but nearer to each other than at the two ends. The transition from the straight cutting edge 13b to each of the recessed lateral edges 17b extends along a discrete connection 19b disposed at an angle .alpha. relative to the respective lateral edge 17b. By narrowing the cutting tool 11b in this manner, chips and other fragments of the material being treated may escape and be removed along the lateral edges 17b.

Figure 7:
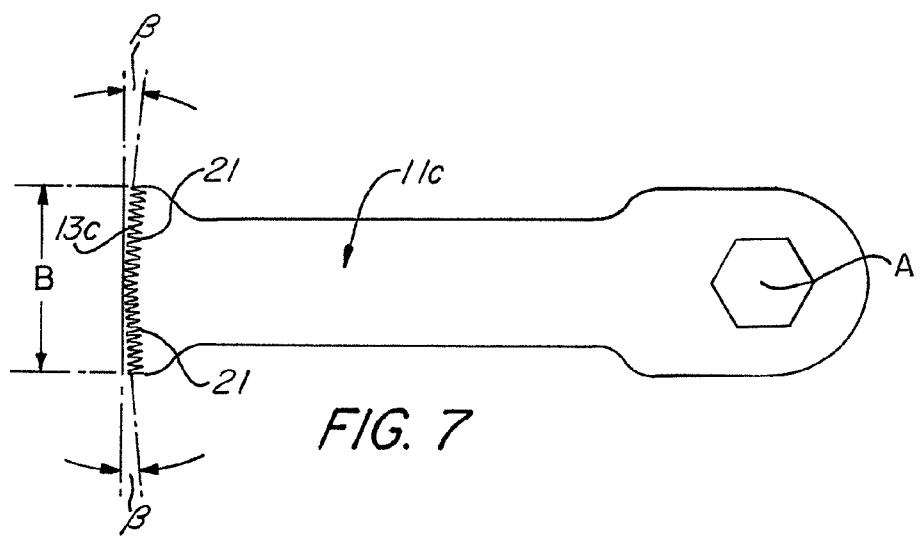
FIG. 7 is a plan view of a tool having two rows of saw teeth disposed at an acute angle to each other.
Figure 13:
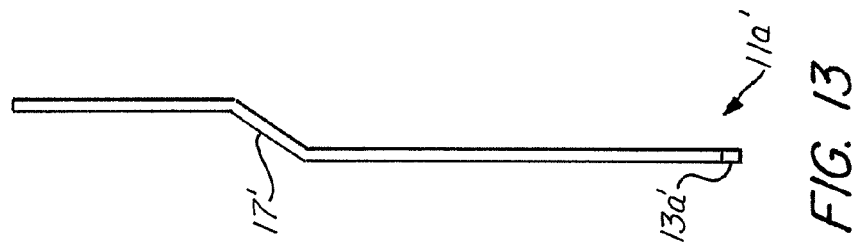
FIG. 13 is a sectional view substantially as seen in the direction of arrows from the line XIII-XIII shown in FIG. 12.

In a particularly advantageous embodiment of the invention as depicted in FIG. 7, the tips of the teeth are not disposed on the cutting edge 13c along a single straight line. Instead, the cutting edge 13c includes two sections 21 disposed at an angle .beta. to each other. The angle .beta. between the straight lines connecting the teeth in each of the sections 21 is a small acute angle. In an arrangement of the character described in connection with and illustrated in FIG. 7, the angle .beta. may range between 1.5.degree. and 2.degree. In short tools, the angle .beta. is preferably greater than 2.degree. but should be less than 2.degree. in shorter tools. In a blade having a length of 100 mm (as measured between the fulcrum on the axis A and the cutting edge 13c), the angle .beta. is preferably about 4.6.degree. Depending upon its selected width B, the cutting edge 13c may be divided into more than two sections 21 with each pair of such sections disposed at an angle .beta. with respect to each other. The plural angles .beta. may but need not be identical with each other. For example, the twin-section cutting edge 13c of the tool 11c shown in FIG. 7 can be replaced with a more complex cutting edge including four sections. Otherwise stated, each section 21 of the cutting edge 13c can be replaced with two straight or at least substantially straight subsections making an acute angle which matches or approximates one of the two angles .beta. shown in FIG. 7.

As has already been mentioned hereinbefore, the design of the cutting edges depends upon the material to be cut or ground. Cutting edges having at least one linear array of at least three teeth, for example, ground teeth or sawteeth, have been found to be particularly advantageous for numerous material removing operations such as those involving the cutting of wood or gypsum (plaster of paris), for instance, at building construction sites; for forming rectangular holes or recesses for the reception of pegs and the like in beams, as is customary for joining beams; for removing window frames to be replaced; and to form grooves for insertion of panels as well as for many other uses. When working with composite plastic materials or stones, cutting edges provided in the usual manner with industrial diamonds have been found to be particularly useful. Metal working has been found to be optimized by employing tools having cutting edges of corundum. The cutting or abrading material can be applied to the cutting edge (such as 13) by resorting to processes familiar to those skilled in the art of making cutting, grinding and other material removing tools of the kind here under consideration.

The material removing tool 11' of FIG. 8 is a cutting tool having an at least substantially straight cutting edge 13' defined by at least one row of teeth, e.g., teeth of the type suitable for the making of cuts in wood or plastic material. The reference character 17' denotes a step provided at the rear portion or section of the elongated metallic member 15' of the tool 11', namely at the portion having an opening 23' serving to non-rotatably receive an oscillatable shaft corresponding to the shaft 7 shown in FIGS. 1 and 2. The acute angle enclosed by the lateral marginal portions 25a', 25b' of the major portion (trapezoidal flat member) 15' of the tool 11' is smaller than the angle between the lateral marginal portions 25a, 25b of the flat member 15 shown in FIG. 3 and/or the angle between the lateral marginal portions 25a'', 25b'' of the elongated member 15'' of the tool 11'' shown in FIG. 9.

The teeth at the material removing (cutting) edge 13' of the tool 11' may but need not be identical with those at the cutting edge 13 of the tool 11 and/or at the cutting edge 13'' of the tool 11''. The tools 11, 11' and 11'' can be utilized interchangeably; therefore, their steps 17' and their openings 23' are or can be identical. The same, holds true for the tools 11b', 11b'' and 11a' which are respectively shown in FIGS. 10, 11 and 12-13, i.e., their openings 23' can non-rotatably receive the shaft which is non-rotatably receivable in the opening 23' of the tool 11' or 11''.

Figure 11:
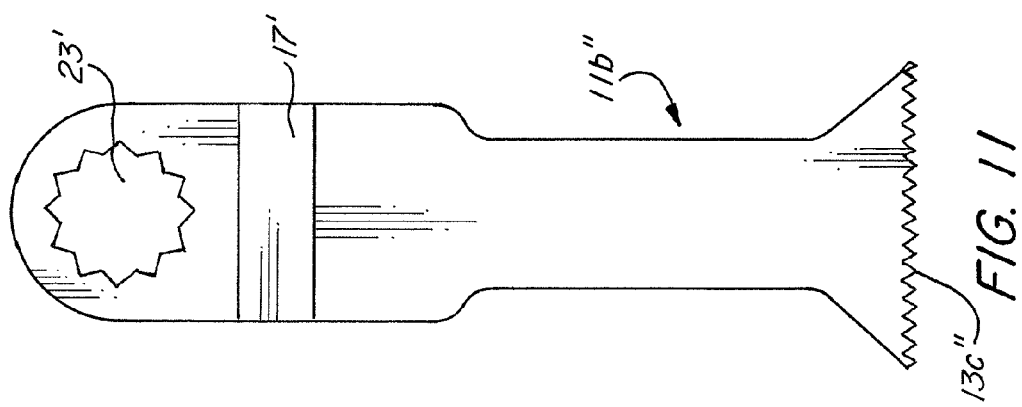
FIG. 11 is a plan view of a tool constituting a modification of the tool shown in FIG. 10.

The difference between the tools 11b', 11b'' of FIGS. 10 and 11 on the one hand, and the tool 11b of FIG. 6 on the other hand, is that the latter has a relatively short intermediate portion 15b (namely the portion bounded by the parallel or substantially parallel side edges 17b). The difference between the tools 11b' and 11b'' is that the latter has a relatively long cutting edge 13c'' (as compared with the cutting edge 13c'). Furthermore, the intermediate portion or section of at least one of these tools can be provided with an elongated slot (see the slot 19c' which is shown in FIG. 10 by phantom lines).

Figure 12:
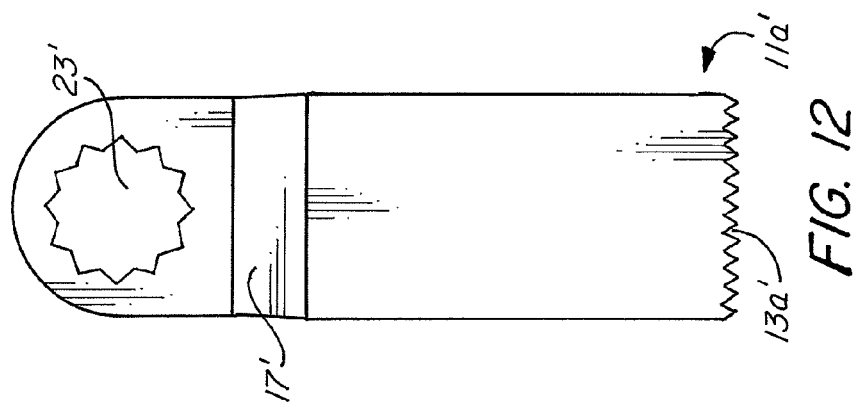
FIG. 12 is a plan view of a tool constituting a simplified modification of the material removing tool shown in FIG. 5.

The difference between the tool 11a of FIG. 5 and the tool 11a' of FIGS. 11-12 is that the intermediate section of the latter does not have a slot 19 as well as that its overall length (between the axis of the shaft non-rotatably receivable in the opening 23' and the cutting edge 13a') is much less than the overall length of the intermediate section of the member 15a of the tool 11a.

To work with the material removing tool in accordance with the invention is a simple procedure. For instance, if hardwood or parquetry or some other kind of cover is to be applied to the floor of a room, and the cover is to extend below an existing door frame, threshold or molding, a groove flush with the floor may be cut or otherwise formed by inserting the rim or margin of the floor cover into it. Not only can such a groove be formed parallel to the cutting edge (such as the cutting edge 13), but it may also be cut in corner sections thus eliminating the need for work with a chisel or the like. The material removing tool, especially if it is provided with a cutting edge having ground teeth or sawteeth, will move into the material to be cut almost automatically, i.e., in response to the exertion of a relatively small force. The straight cutting edge or edges ensures or ensure a uniform depth of the groove or recess even in the corner sections of a structure. By comparison, if similar grooves are formed by a round or curved cutting tool, their depth does not diminish in the corner areas and they also fail to provide the clean cut edges achieved with an apparatus employing the tool of the present invention.

All (or at least some) of the tools shown in FIGS. 1 to 13 can form part of a kit for use with one and the same apparatus, such as the apparatus 1 of FIGS. 1 and 2. All that is necessary is to provide a separable connection (such as the fastening means 9) and identical openings 23'. The just discussed feature also ensures that a defective tool (such as the tool 11) can be replaced with an identical new tool or with an identical used tool 11.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the above outlined contribution to the art of making material removing tools and, therefore, such adaptations should and are intended to be comprehended within the meaning and range of equivalence of the appended claims.

What is claimed is:

1. A material removing apparatus comprising a power-driven output shaft arranged to oscillate about a predetermined axis, a tool and a fastener attaching said tool to the output shaft, the fastener having a thickness, said tool comprising:
    an elongated member having a rearward generally flat first section lying in a first plane, with a mounting opening being configured to be mounted on said output shaft with the fastener so that the first plane is at least substantially normal to said predetermined axis; and
    a forward generally flat second section lying in a second plane, said second section being remote from said first section and including at least one at least substantially straight elongated cutting edge also lying in the second plane, said at least one at least substantially straight elongated cutting edge comprising two adjoining straight sections disposed at an acute angle with respect to a line normal to a longitudinal axis of the tool, each of said two adjoining straight sections comprising a plurality of teeth disposed in substantially a straight line;
    wherein said elongated member comprises a step of finite length at least equal to the thickness of the fastener intermediate said first and second sections thereof:
    wherein said step of finite length is configured so that the first and second planes, and consequently said first and second sections of said elongated member, extend substantially parallel to each other, so that the second plane is further from the manually driven apparatus than the first plane, whereby the second plane is closer to the workpiece during use of the apparatus than is the first plane.

2. The apparatus of claim 1, wherein said acute angle is between about 1.5° and about 4.6°.

3. The apparatus of claim 1, wherein said acute angle is between about 1.5° and about 2°.

4. The apparatus of claim 1, wherein said elongated member is configured with at least one elongated path that facilitates rearward movement, along said path, of material being cut from the workpiece by said cutting edge, as well as removal of the material being cut, and wherein said at least one path is provided by at least one slot that extends between said first and second sections.

5. The apparatus of claim 1, wherein said at least one cutting edge has first and second ends and recessed portions are provided at said ends of said at least one cutting edge intermediate said first and second sections.

6. The apparatus of claim 1, wherein said elongated member has an at least substantially constant width at least between said first and second sections thereof.

7. The apparatus of claim 1, wherein said member has a substantially trapeziform outline.

8. The apparatus of claim 1, wherein said elongated member further comprises a third section disposed between said first and second sections and having a first width, at least one of said first and second sections having a second width different from said first width.

9. A tool for making in workpieces cuts having predetermined widths and bounded by walls, said tool adapted for use with an apparatus having a power driven output shaft arranged to oscillate about a predetermined axis and a fastener attaching said tool to the output shaft, the fastener having a thickness, said tool comprising:
    an elongated member having a rearward generally flat first section lying in a first plane, with a mounting opening being configured to be mounted on the output shaft with the fastener so that the first plane is at least substantially normal to said predetermined axis; and
    a forward generally flat second section lying in a second plane, said second section being remote from said first section and including at least one at least substantially straight elongated cutting edge, said at least one at least substantially straight elongated cutting edge comprising two adjoining straight sections disposed at an acute angle with respect to a line normal to a longitudinal axis of the tool, each of said two adjoining straight sections comprising a plurality of teeth disposed in substantially a straight line;
    wherein said elongated member comprises a step of finite length at least equal to the thickness of the fastener intermediate said first and second sections thereof;
    wherein said step of finite length is configured so that the first and second planes, and consequently said first and second sections of said elongated member, extend substantially parallel to each other, so that the second plane is further from the manually driven apparatus than the first plane, whereby the second plane is closer to the workpiece during use of the tool than is the first plane.

10. The tool of claim 9, wherein said acute angle is between about 1.5° and about 4.6°.

11. The tool of claim 9, wherein said acute angle is between about 1.5° and about 2°.

12. The tool of claim 9, wherein said elongated member is configured with at least one elongated path that facilitates rearward movement, along said path, of material being cut from the workpiece by said cutting edge, as well as removal of the material being cut, and wherein said at least one path is provided by at least one slot that extends between said first and second sections.

13. The tool of claim 9, wherein said at least one cutting edge has first and second ends and recessed portions are provided at said ends of said at least one cutting edge intermediate said first and second sections.

14. The tool of claim 9, wherein said elongated member has an at least substantially constant width at least between said first and second sections thereof.

15. The tool of claim 9, wherein said member has a substantially trapeziform outline.

16. The tool of claim 9, wherein said elongated member further comprises a third section disposed between said first and second sections and having a first width, at least one of said first and second sections having a second width different from said first width.

* * * * *